Aug. 8, 1950  J. G. DE FLON  2,517,639
COOLING TOWER WATER DISTRIBUTION SYSTEM
Filed Dec. 24, 1946  2 Sheets-Sheet 1

JAMES G. DE FLON
INVENTOR.

BY
ATTORNEY

Aug. 8, 1950     J. G. DE FLON     2,517,639
COOLING TOWER WATER DISTRIBUTION SYSTEM
Filed Dec. 24, 1946     2 Sheets-Sheet 2

JAMES G. DEFLON
INVENTOR.

BY *Woodwin White*

ATTORNEY

Patented Aug. 8, 1950

2,517,639

UNITED STATES PATENT OFFICE 2,517,639

COOLING TOWER WATER DISTRIBUTION SYSTEM

James G. De Flon, Los Angeles, Calif., assignor to The Fluor Corporation, Ltd., Los Angeles, Calif., a corporation of California Application December 24, 1946, Serial No. 718,150

3 Claims. (Cl. 261—110)

This invention has to do with industrial plant water cooling towers, i. e. either of the atmospheric type having an open side wall formation capable of passing wind currents transversely through the tower, or mechanical draft types having closed wall formations defining cooling chambers through which air flow is mechanically produced as by motor driven fans. More particularly the invention is concerned with improvements in water collecting and distributing systems, specifically for maintaining selective and controllably variable water distribution over cooling coils within the base of the tower.

It is common practice to effect distribution over such coils of water that has become cooled during its passage down through the upper portion of the towers, through various arrangements of collectors and redistribution means.

My primary object is to improve upon such part water collecting and redistribution systems, particularly with respect to the maintenance of selective control over the quantity of water to be passed over individual sections of the cooling coils, and the taking of air into the water streams to increase the effectiveness of their spread or distribution over the coil surfaces. Contemplated also are improved and simplified structural features for controlling the water distribution in a manner assuring continued operation under any of various conditions within close control of the operator.

In accordance with the invention I employ a water collecting or pick-up deck forming an outer basin receiving the entire water being put through the tower, and a plurality of inner or distributing basins or flumes receiving water by gravity flow from the outer basin at a rate controllable by a novel valve or weir arrangement operable from the outside of the tower. These inner basins, in turn, are so related to the cooling coils below that a given section or unit of the coils receives its cooling water from one or more inner basins, the rate of water delivery from which is controllable in accordance with the inflow from the outer basin. Thus where the cooling load on a given coil section is different from the cooling required by other coils, the rate of water delivery to that section may be selectively controlled by varying the quantity of water being taken from the outer basin into the inner basin supplying the particular coil section.

Delivery of water to the coil occurs through overflow into one or more down pipes and of course at a rate depending upon the hydrostatic head above the pipe inlets. At times, the necessary rate of water delivery over the coil may be so low that normally the water will not tend to spread and distribute itself over the coil so that its surfaces will remain wet at all times. The invention affords a solution to the difficulty of adequate water spread at the down flow rates, in that it is found that air taken into the down pipes in intervals or slugs, will produce corresponding surges of the water which throw and spread the water more uniformly and beyond the range of distribution it would otherwise have. Accordingly, provision is made for maintaining the water level over the down pipes sufficiently low as to create a swirling entry of water to the pipes, accompanied by the intermittent entrapment and taking into the pipes of air slugs.

For more complete understanding of the invention, its various features and objects, reference may be had to the following detailed description of a typical embodiment shown by the accompanying drawing, in which.

Figure 1:
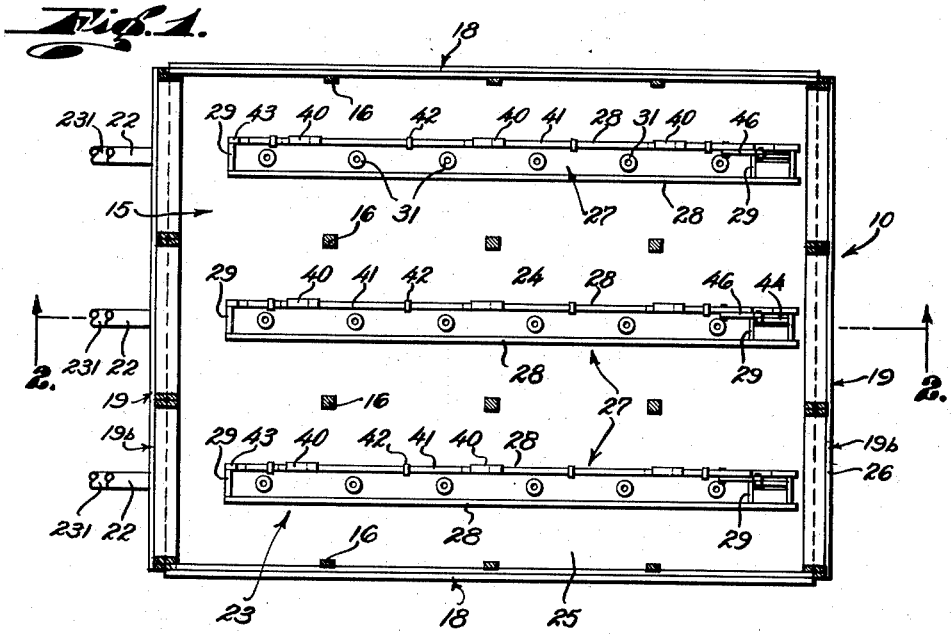
Fig. 1 is a transverse sectional view of the tower taken on line 1—1 of Fig. 2, directly above the water cooling and distributing basins.
Figure 2:
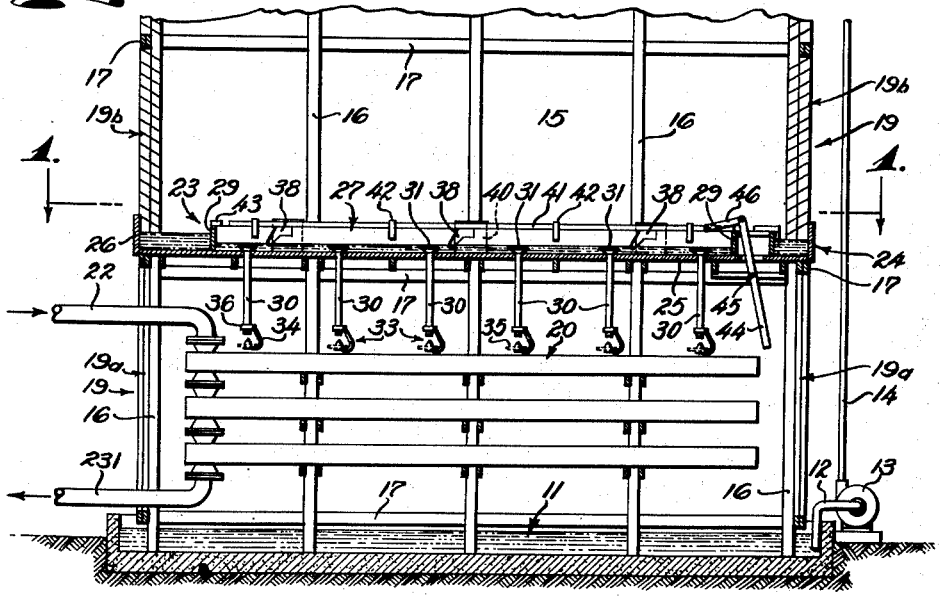
Fig. 2 is a vertical section on line 2—2 of Fig. 1.

In Figs. 1 and 2 of the drawings, the cooling tower structure generally indicated at 10 is to be regarded with respect to its shape, framing and wall formation as typical of various specific atmospheric or mechanical draft water cooling tower structures to which the invention is applicable. Since the invention is concerned primarily with a system for cooling and distributing the cooled water over pipe coils or sheds in the bottom portion of the tower, it is unnecessary to illustrate or consider the top structure of the tower. To those familiar with the art, it will suffice to indicate that water to be cooled in the tower is taken from its basin 11 through suction pipe 12 and discharged by pump 13 through line 14 to any of the usual water distributing or spray arrangements in the upper portion of the tower, from which the water is showered downwardly within its interior 15 over any appropriate decking that may be used.

The illustrated lower portion of the tower structure may comprise an appropriate frame work including the vertical columns 16 and trans chords 17, the columns having footings within the bottom cooling basin 11. Considering the tower as extending longitudinally in the vertical direction of Fig. 1, it will be understood that the tower may have any desired length, depending upon its water cooling load, and may include any required number of sections or bays individually constituting the sections between successive transverse rows of the column 16. The side walls 19 have bottom openings 19a opposite the pipe coils or sheds 20, and above their open portions 19a. In an atmospheric cooling tower, portions 19b of the side walls have any of the usual slatted or louver formations permitting passage of wind currents through the interior 15 of the tower and in contact with the water being showered downwardly therein. In a mechanical draft tower, e. g. induced draft type, the side walls may be closed above portions 19b, and an upward flow of air through chamber 15 created in the usual fan at the top of the tower. The end walls 18 of the tower may have from the basin up, the slatted or louver formation of the side walls in an atmospheric tower, or may be continuous or closed in a mechanical draft tower.

As is customary, the conventionally illustrated pipe coils 20 are installed within the bottom interior of the tower for the purpose of cooling or condensing fluids, delivered to the coils for example through line 22 and discharged therefrom through line 23l. The invention is directed to an improved water cooling system, generally indicated at 23, for assuring proper and adequate water distribution over the coils 20.

Figure 3:
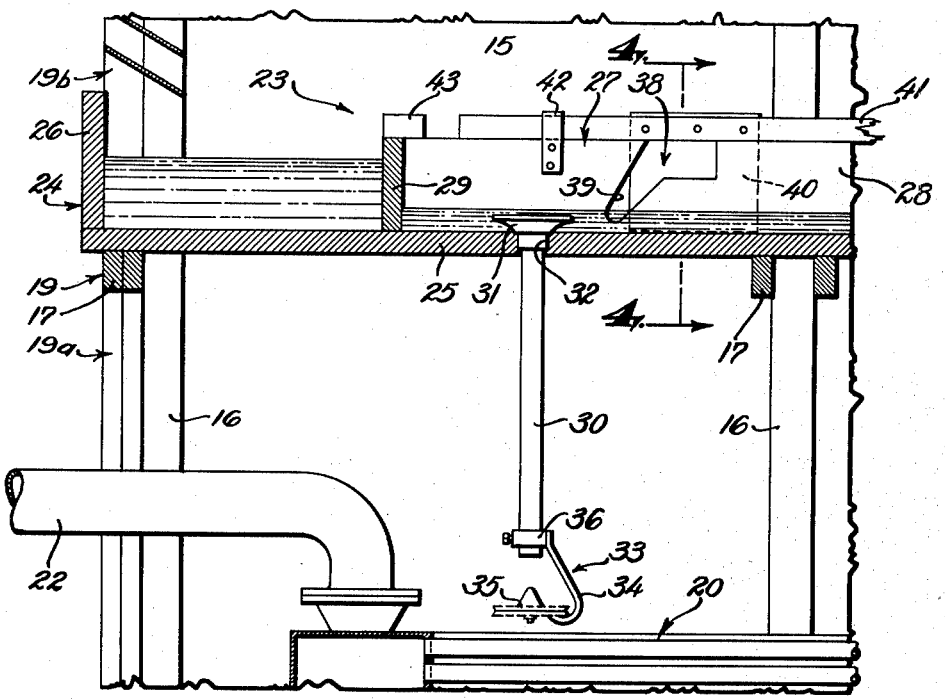
Fig. 3 is an enlarged fragmentary sectional view showing the basin, down-pipe and coil arrangement.

The system 23 includes a collecting basin 24 having a floor 25 and side and end walls 26, and occupying substantially the entire transverse area of the tower so that all the water showering downwardly through the tower thus is collected in the basin. This basin contains a series of transverse and relatively narrow distributing basins or flumes 27, each defined by its side walls 28, see Fig. 4, and ends 29. Referring to Fig. 3, water is delivered from each distributing basin 27 to the coils 20 below, through overflow or down pipes 30 each having an open mouth in the form of a flared head 31 received within an opening 32 within the floor 25. Water passing through the down pipes may be distributed over the coils in any suitable manner, as by spray nozzles 33 each comprising a bracket arm 34 carrying the baffle or nozzle proper 35, and detachably secured by collar 36 to the pipe. Water overflows from the basin 27 into the down pipe at a rate dependent upon the height of the water head above the inlet end 31 of the pipe. Generally speaking, the radial extent and density of the spray dispersed radially by the nozzle 33 over the coils 20, is dependent upon the quantity of water discharged through the down pipe against the baffle portion 35 of the nozzle.

A feature of particular advantage is the facility with which the down pipes 30 may be removed for any purpose, as for example replacement or reconditioning of the spray nozzles. For this purpose it is only necessary to disconnect the nozzle and lift the down pipe out of the floor opening 32.

Water enters each distributing basin 27 from the collecting basin 24 through a series of inlets 38 in one of the basin sides 28, the inlets being arranged at such spaced intervals as to facilitate maintenance of uniformity in the water level throughout the length of the basin. Each inlet 38 may be shaped as illustrated to include an angular convergent portion 39 permitting, by its relation to the valve, close regulation of the rate of water in flow.

Figure 4:
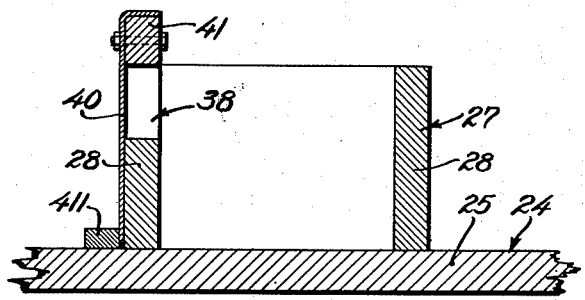
Fig. 4 is an enlarged fragmentary section on line 4—4 of Fig. 3.

Passage of water through the inlets 38 is controlled by a corresponding number and arrangement of slide valves 40, see Fig. 4, in the form of plates having their lower edges confined at the inside of guide strip 411, the top portion of the valve being attached to a control bar 41 extending through guides 42 and engageable with a stop 43 at the closed positions of the valves. Referring to Fig. 2, each valve series is controllable by lever 44 pivotally supported at 45 and connected by link 46 to the end of bar 41. As will be understood, the coils individually may receive heated fluids from different sources and accordingly have different cooling loads. The maximum rate of water flow over any coil is maintained by keeping in its distributing basin or trough 27 a water level as high as that in the outer basin 24. Should any coil require less cooling, valves 40 may be closed to degrees maintaining in the basin 27 a lowered water head just sufficient for cooling of the coil. And as will be apparent, the valves associated with different distributing basins 27 may be variably set or regulated in accordance with the water requirements of their respective coils.

As previously indicated, it is commonly found that a reduction of the water delivery for surface cooling of the coil creates difficulties by reason of the inability of the water by gravity flow and distribution, to at all times wet the coil surfaces. Constant and adequate water distribution over the coil is assured by the invention despite reductions of the water level over the down pipes 30, in that upon lowering of the water level its swirling overflow into the down pipe draws into the pipe intermittent slugs of air which tend to expel the water against the nozzle or any other distributing surface that may be employed, at such velocity and air dilution as to create a spray or splash having a radial extent from the point of impact so great as to reach and constantly wet all surfaces of the coil.

I claim:

1. In a water cooling tower, a deck structure forming an outer water collecting basin and an elongated distributing basin within and communicable with said outer basin, overflow pipes extending through the bottom of said distributing basin at longitudinally spaced intervals therein, a plurality of water inlet weirs spaced longitudinally in a side wall of the distributing basin, a series of slide valves cooperable with said weirs, and means for simultaneously operating the valves to control the delivery of water from said outer basin to the distributing basin and for varying the water head above said down pipes.

2. In a water cooling tower, a deck structure forming an outer water collecting basin extending longitudinally of the tower, pipe coils beneath said basin, successive elongated water distributing basins extending transversely of the tower within said outer basin and communicable therewith, overflow pipes extending through the bottom of said distributing basins at longitudinally spaced intervals therein, a series of water inlet weirs spaced longitudinally in a side wall of each distributing basin, a series of slide valves for controlling the flow of water from the outer basin through said weirs into the distributing basin, and actuating means connected to said valve series.

3. In a water cooling tower, a deck structure forming an outer water collecting basin extending longitudinally of the tower, pipe coils beneath said basin, successive elongated water distributing basins extending transversely of the tower within said outer basin and communicable therewith, overflow pipes extending through the bottom of said distributing basins at longitudinally spaced intervals therein, a series of water inlet weirs spaced longitudinally in a side wall of each distributing basin, a series of slide valves for controlling the flow of water from the outer basin through said weirs into the distributing basin, and actuating means connected to said valve series and accessible to an operator at the outside of the tower.

JAMES G. DE FLON.

REFERENCES CITED

The following references are of record in the file of this patent:

UNITED STATES PATENTS

| Number | Name | Date |
| --- | --- | --- |
| 700,990 | Stocker | May 27, 1902 |
| 1,176,747 | Ferguson | Mar. 28, 1916 |
| 1,874,020 | Martin | Aug. 30, 1932 |
| 2,247,514 | Mart | July 1, 1941 |

FOREIGN PATENTS

| Number | Country | Date |
| --- | --- | --- |
| 21,205 | Great Britain | Oct. 19, 1914 |
| 46,666 | Austria | June 26, 1911 |
| 857,376 | France | Apr. 15, 1940 |